United States Patent [19]

Beinhauer

[11] Patent Number: 5,412,511
[45] Date of Patent: May 2, 1995

[54] HOLDING DEVICE FOR INTERIOR MIRRORS IN VEHICLES

[76] Inventor: Uwe Beinhauer, Am Seeberg 12a, D-6380 Bad Homburg, Germany

[21] Appl. No.: 869,259

[22] Filed: Apr. 15, 1992

[30] Foreign Application Priority Data

Apr. 16, 1991 [DE] Germany .......... 41 12 348.4

[51] Int. Cl.⁶ .............. G02B 7/18; B60R 1/04
[52] U.S. Cl. .................... 359/872; 248/477; 248/479; 248/481
[58] Field of Search .......... 359/872; 248/476, 477, 248/478, 479, 481, 483, 484, 549, 900

[56] References Cited

U.S. PATENT DOCUMENTS

| | | | |
|---|---|---|---|
| 1,932,697 | 10/1933 | Jankovic | 248/484 |
| 2,661,177 | 12/1953 | Hofer | 248/484 |
| 2,911,177 | 11/1959 | West | 248/484 |
| 4,359,264 | 11/1982 | Zeigler et al. | 248/484 |
| 4,645,316 | 2/1987 | Ohyama | 359/872 |
| 4,899,975 | 2/1990 | Suman | 248/481 |
| 4,934,802 | 6/1990 | Fluharty et al. | 359/872 |

FOREIGN PATENT DOCUMENTS

| | | |
|---|---|---|
| 8022080 U | 8/1980 | Germany . |
| 8318309 U | 6/1983 | Germany . |
| 33 37 745.6 | 10/1983 | Germany . |
| 33 36 795.7 | 10/1983 | Germany . |
| 35 46 344.9 | 12/1985 | Germany . |

*Primary Examiner*—Ricky D. Shafer
*Attorney, Agent, or Firm*—David M. Klein; Bryan Cave

[57] ABSTRACT

A holding device for an interior mirror (2) in vehicles which allows an adjustment of the height at which this interior (2) mirror is installed. A holding arm (1), which bears the interior mirror (2) at a ball-and-socket joint (1a), is fitted as rotating around a swivelling axis (4) in an oblique position, which runs through a pivot (3), which in turn is fitted by means of a spacing element (1b) at a certain distance (5) from the holding arm (1). The pivot (3) can either be fitted to the spacing element (1b) of the holding arm (1) or to a holding base (6) with which the whole device is fixed in the vehicle. In order to lock the height of the interior mirror (2) a manually operated locking device (7) or an automatic locking device (8), which links the holding arm (1) or the spacing element (1b) to the holding base (6), is used.

7 Claims, 2 Drawing Sheets

HOLDING DEVICE FOR INTERIOR MIRRORS IN VEHICLES

TECHNICAL FIELD

The subject-matter of this invention is a holding device for an interior mirror in vehicles which allows an adjustment of the height at which this interior mirror is installed.

BACKGROUND ART

The users of motor vehicles have differences in height. The possibilities of adjustment of the driver's seat are adapted to the operating elements, such as the steering wheel and the pedals. In the event of the holding device used so far, which allows only an inclination of the interior mirror, the height of the interior mirror thus represents a compromise, which is oriented on the "average height" of the drivers.

For small drivers the interior mirror is, therefore, fitted too high. In order to observe the traffic behind the vehicle, it is under these circumstances necessary to raise one's head in order to look into the interior mirror, something drivers of an average height can do by merely raising their eyes. As a result attention is deviated for a dangerously long time from the traffic in front of the moving vehicle. In some instances it is not even possible to observe the traffic behind the vehicle by means of the interior mirror, since in order to be able to look into the mirror, it must be inclined to such an extent that it is no longer directed to the rear window of the vehicle, but to hat rack and/or the trunk lid.

For tall drivers the interior mirror is fitted too low, so that it restricts part of the field of vision on the right at the front. This results in dangerous situations, because other vehicles or pedestrians are masked by the interior mirror when turning right and the course of right turns can sometimes not be seen without moving the entire upper part of the body in order to look past the interior mirror.

It is, therefore, appropriate to install the interior mirror in vehicles in such a way that its height can be adjusted.

Several proposals have been made in the prior art with respect to the design of such a holding device, such as a telescopic arm as described in German Patent No. DE 35 46 344 A1, published Jun. 12, 1986, or a second joint at the foot of the holding device as described, for example, in the German Patent No. DE 33 36 795 A1, published May 2, 1985, and German Utility Model No. G 83 18 309.4, published Oct. 20, 1983 or devices with two mobile arms as described in German Patent No. DE 33 37 745 A1, published Apr. 25, 1985, or a device which consists of a parallelogram, as described in German Utility Model No. G 80 22 080.0, published Jun. 11, 1981.

A common feature of all of these prior art proposals is that the entire holding device can already be misadjusted through the normal adjustment of the inclination of the interior mirror or during dimming, so that both hands must frequently be used for such simple handling procedures. Because of the many joints there is a risk that the entire holding device becomes unstable after a prolonged service life and the interior mirror is misadjusted during driving, for example, by vibrations.

DISCLOSURE OF THE INVENTION

The underlying task of the present invention is to design a holding device for interior mirrors in vehicles with which it is possible to adjust the height at which the interior mirror is installed, without having to use both hands, without a risk of misadjustment of the holding device at the adjustment of the inclination of the interior mirror or during dimming and which remains stable even after prolonged service life of the vehicle.

This task is fulfilled by a holding arm which bears an interior mirror at a ball-and-socket joint, which is fitted as rotating around a swivelling axis in an oblique position, which runs through a pivot which, in turn, is fitted by means of a spacing element at a certain distance from the holding arm. The pivot can either be fitted to the spacing element of the holding arm or to a holding base with which the whole device is fixed in the vehicle. In order to lock the height of the interior mirror, a manually operated locking device, or an automatic locking device, which links the holding arm or the spacing element to the holding base, is used. For adjustments, the interior mirror is seized with one hand and, after release of the locking device, rotated around the oblique swivelling axis with the holding arm.

BEST MODE FOR CARRYING OUT THE INVENTION

Figure 1:
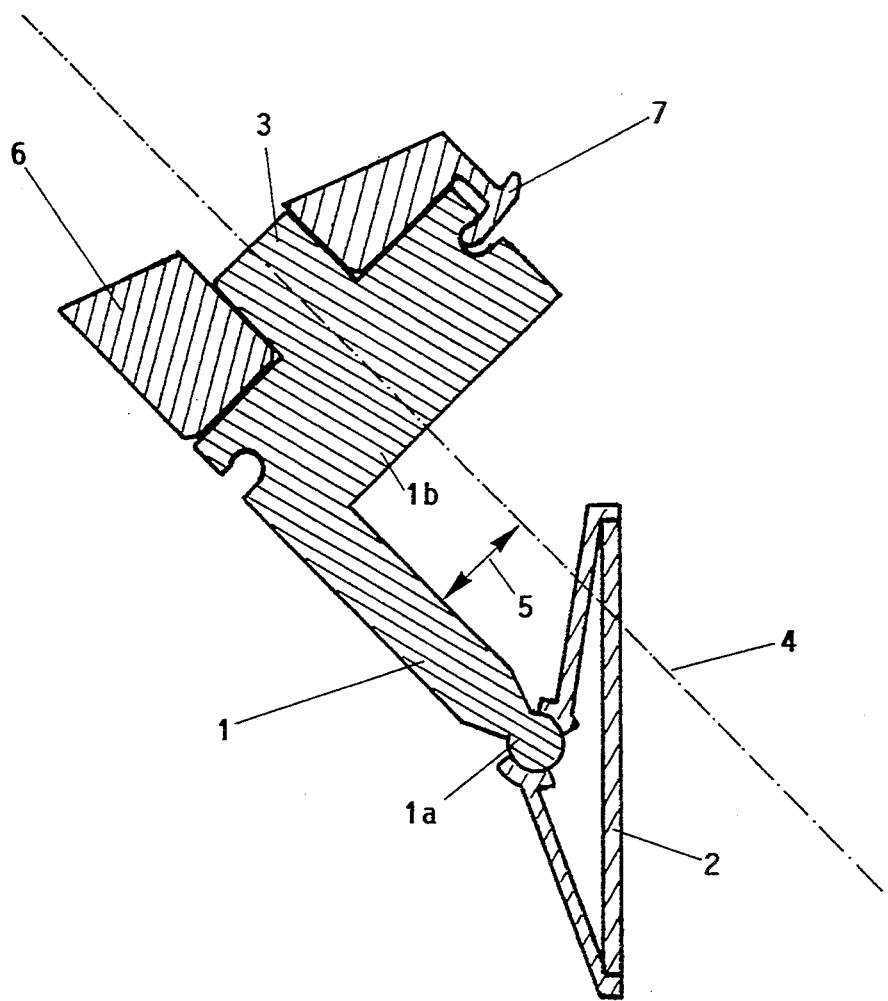
FIG. 1 is a diagrammatic illustration, in section, of the holding device of the present invention, with the interior mirror shown in the upper position, with a pivot fitted to a spacing element of a holding arm, and with a manually operated locking device being employed.

Referring now to the drawings in detail, and initially to FIG. 1, the holding device of the present invention comprises a holding arm (1), which bears an interior mirror (2) at a ball-and-socket joint (1a), which is fitted as rotating around a swivelling axis (4) in an oblique position, which runs through a pivot (3), which in turn is fitted by means of a spacing element (1b) at a certain distance (5) from the holding arm (1). The pivot (3) can either be fitted to the spacing element (1b) of the holding arm (1) or to a holding base (6) with which the whole device is fixed in the vehicle. In order to lock the height of the interior mirror (2) a manually operated locking device (7) or an automatic locking device (8) (FIG. 2), which links the holding arm (1) or the spacing element (1b) to the holding base (6), is used.

Figure 2:
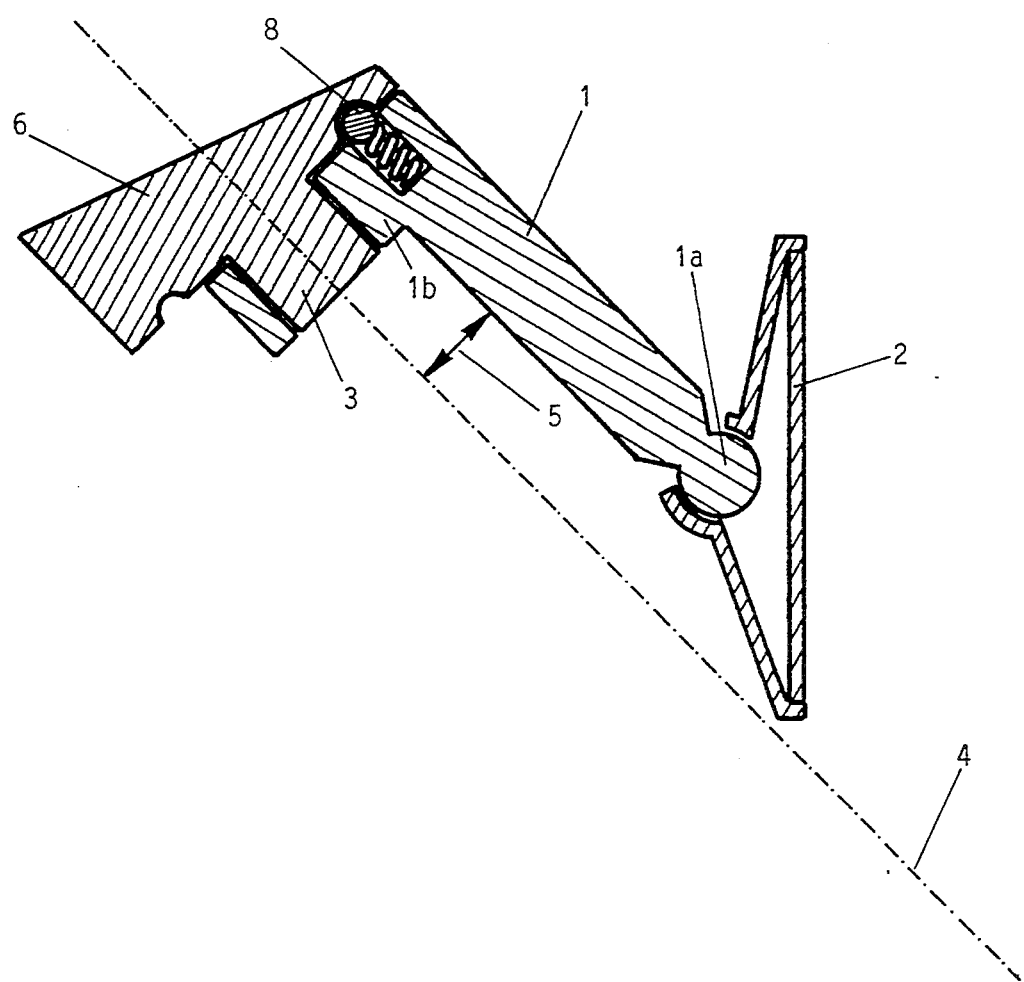
FIG. 2 is a diagrammatic illustration, in section, similar to FIG. 1, with the interior mirror shown in the lower position, with a pivot fitted to a holding base, and with an automatic locking device employed.

For adjustments, the interior mirror (2) is seized with one hand and, after the release of a manually operated locking device (7), or, in the instance of the arrangement of FIG. 2, after release of the automatic locking device (8), rotated around the oblique, swivelling axis (4) with the holding arm (1). Since the interior mirror (1) then rotates around the ball-and-socket joint (1a), it always points into the same direction. Since the oblique swivelling axis (4) is in an oblique position, the rotation of the holding arm (1) around the axis adjusts the height of the interior mirror (1) by the double of the distance (5) between the holding arm (1) and the oblique swivelling axis (4).

The advantages of the proposed holding device are as follows:

Under all circumstances only one hand is necessary to adjust the height of the interior mirror (2).

Since the holding arm (1) supports itself with the surface of the spacing element (1b) on the holding base (6) and since these two components are linked by means of a manually operated locking device (7) or by an automatic locking device (8) (FIG. 2), the entire holding device is not misadjusted by the adjustment of the inclination of the interior mirror (2) or by its dimming.

For the adjustment of the height of the interior mirror (2) and for the adjustment of the inclination of the interior mirror (2) two completely different movements are necessary, so that handling does not involve any sources of errors.

Since the adjustment of height and of the inclination of the interior mirror (2) are separated from one another, the individual parts are less stressed by the various adjustments and maintain operability over a longer period of time.

Since the oblique swivelling axis (4) does not run through the ball-and-socket joint (1a) which bears the interior mirror (2), play which might occur in the course of time in the joints, does nevertheless not add up.

The primary difference between the arrangement shown in FIG. 1 and the arrangement shown in FIG. 2 is that in FIG. 1, the holding device of the present invention comprises a pivot (3) fitted to a spacing element (1b) of a holding arm (1), with a manually operated locking device (7) releasably holding the interior mirror (2) in place, illustrated in which the interior mirror (2) is in the upper position, and in FIG. 2, the holding device comprises a pivot (3) fitted to a holding base (6), with an automatic locking device (8) releasably holding the interior mirror (2) in place, in which the interior mirror (2) is illustrated in the lower position.

What is claimed is:

1. A holding device for an interior mirror of a vehicle comprising:
    a pivot having a swivelling axis;
    a holding arm comprising a ball-and-socket joint, said interior mirror being mounted to said holding arm at said ball-and-socket joint for rotation around the swivelling axis in an oblique position, the holding arm having a central axis;
    a spacing element extending between the pivot and the holding arm for spacing the central axis of the holding arm a fixed predetermined distance from said swivelling axis, The spacing element and the pivot cooperating to enable the spacing element to be rotated around the swivelling axis and for rotating the holding arm and the ball-and-joint socket around the swivelling axis in an oblique manner;
    and means for releasably locking the height of said interior mirror in said vehicle; said interior mirror being adjustable after release of said locking device by rotation of said holding arm around said swivelling axis, said interior mirror rotating around said ball-and-socket joint, said rotation of said holding arm around said swivelling axis adjusting the height of said interior mirror by double said predetermined distance between said holding arm and said swivelling axis.

2. A holding device in accordance with claim 1 wherein said locking means comprises a manually operable locking means.

3. A holding device in accordance with claim 1 wherein said locking means comprises an automatically operable locking means.

4. The holding device according to claim 1 further comprising a holding base, the pivot being fixed in relation to the holding base, the spacing element secured to and rotatable around the pivot.

5. The holding device according to claim 1 wherein the pivot is fixed to the spacing element and further comprising:
    a holding base having an opening adapted to receive the pivot for enabling the pivot and the spacing element to rotate relative to the holding base.

6. A holding device for an interior mirror of a vehicle comprising:
    a holding arm, said holding arm comprising a ball-and-socket joint, said interior mirror being mounted to said holding arm at said ball-and-socket joint for rotation around a swivelling axis in an oblique position, said holding arm having pivot along said swivelling axis; a holding base for mounting said holding device to said vehicle, said pivot being fitted to said holding base for spacing said holding arm and said ball-and-socket joint a predetermined distance from said swivelling axis; and automatically operable means for releasably locking the height of said interior mirror in said vehicle; said interior mirror being adjustable after release of said locking device by rotation of said holding arm around said swivelling axis in an oblique manner, said interior mirror rotating around said ball-and-socket joint, said rotation of said holding arm around said swivelling axis adjusting the height of said interior mirror by double said predetermined distance between said holding arm and said swivelling axis.

7. A holding device for an interior mirror of a vehicle comprising:
    a holding arm, said holding arm comprising a ball-and-socket joint, said interior mirror being mounted to said holding arm at said ball-and-socket joint, for rotation around a swivelling axis in an oblique position, said holding arm having a pivot along said swivelling axis and further comprising a spacing element to which said pivot is fitted for spacing said holding arm and said ball-and-socket joint a predetermined distance from said swivelling axis; and automatically operable means for releasably locking the height of said interior mirror in said vehicle; said interior mirror being adjustable after release of said locking device by rotation of said holding arm around said swivelling axis in an oblique manner, said interior mirror rotating around said ball-and-socket joint, said rotation of said holding arm around said swivelling axis adjusting the height of said interior mirror by double said predetermined distance between said holding arm and said swivelling axis.

* * * * *